Dec. 6, 1938.　　　W. H. YOUNT　　　2,138,824
HOIST
Filed April 12, 1937　　　3 Sheets-Sheet 1
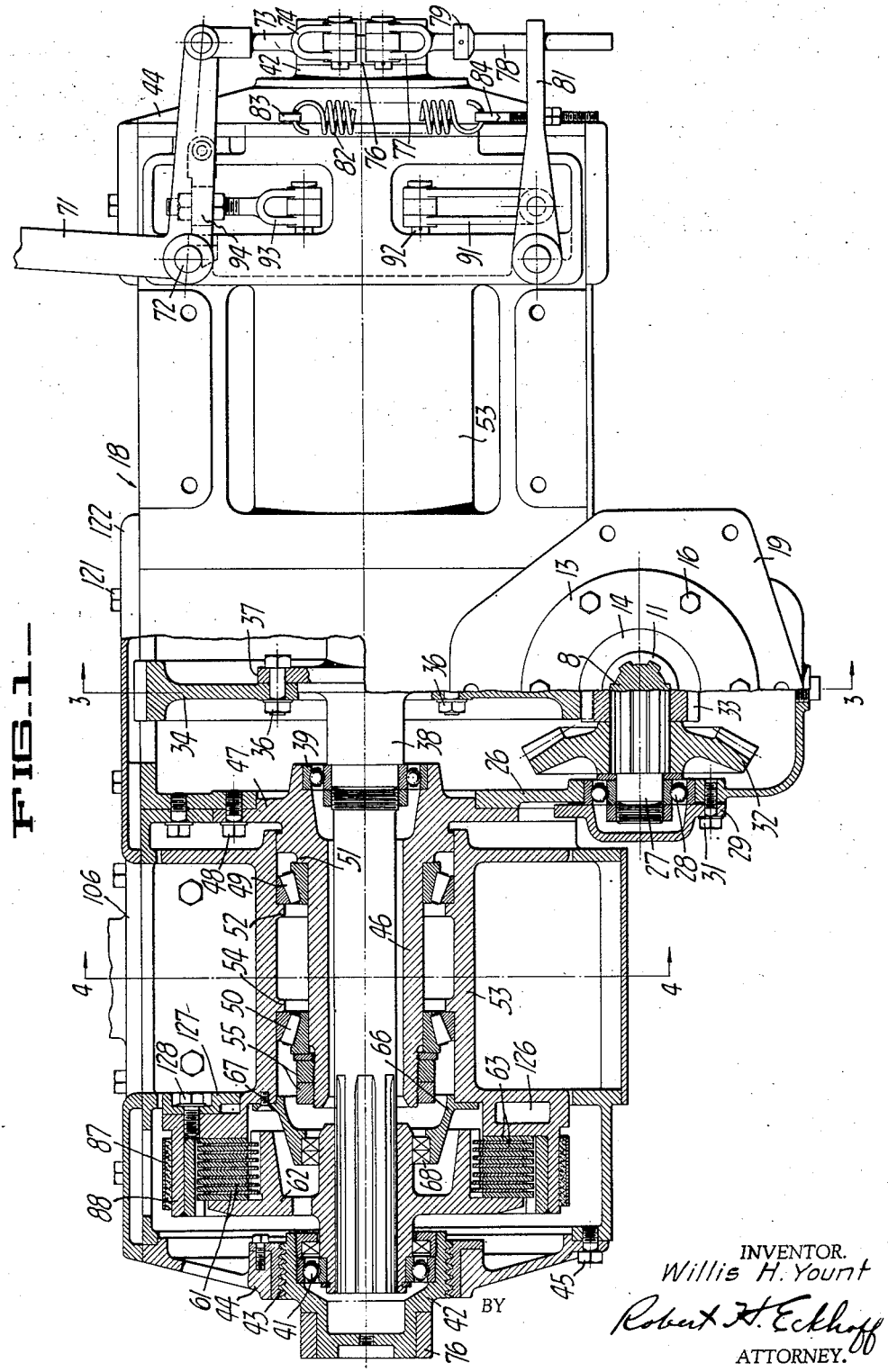
INVENTOR.
Willis H. Yount
BY Robert H. Eckhoff
ATTORNEY.

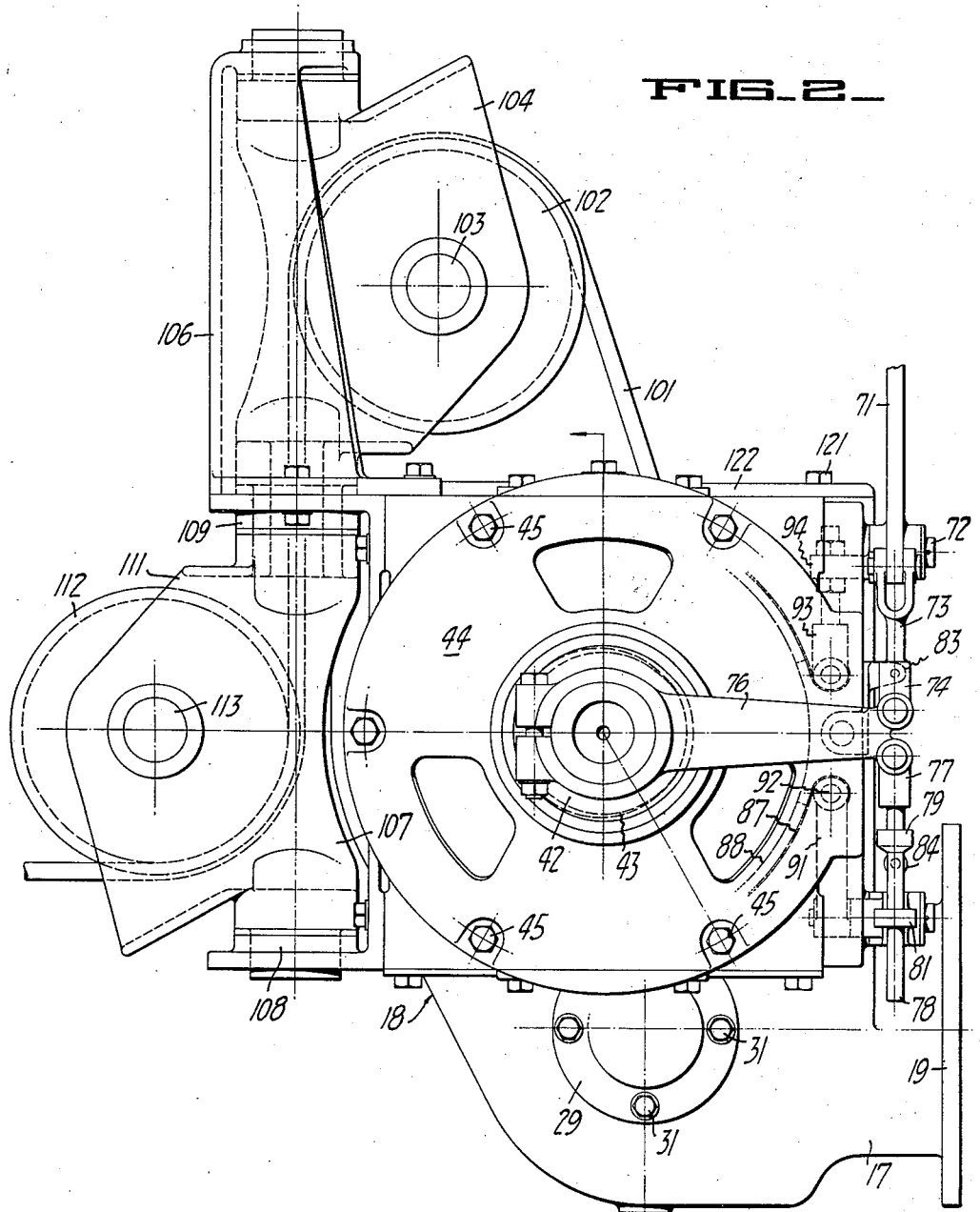

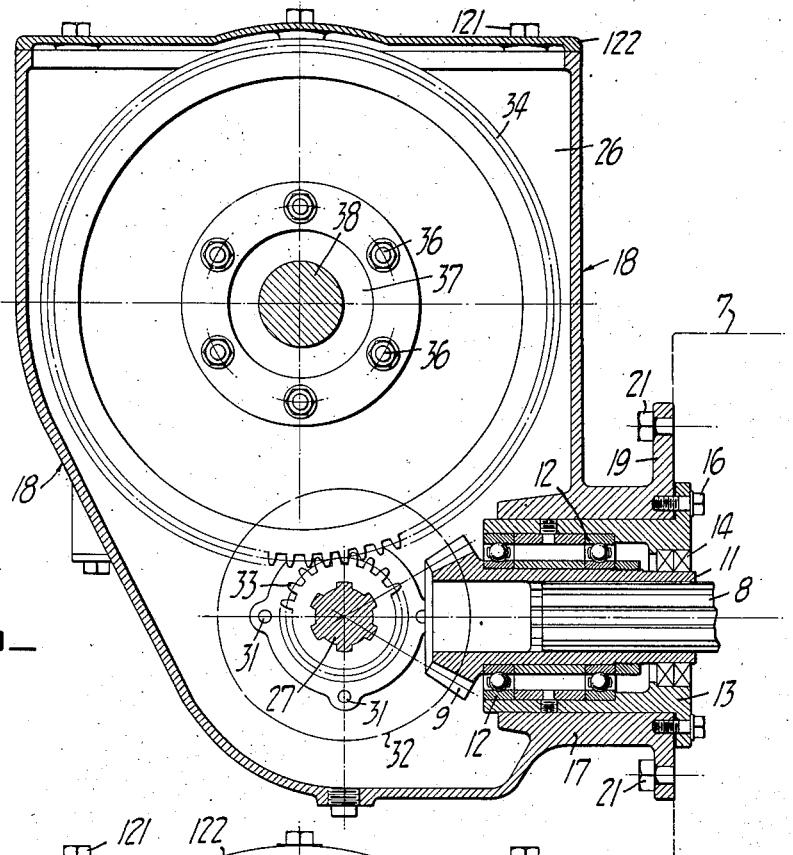
FIG_3_
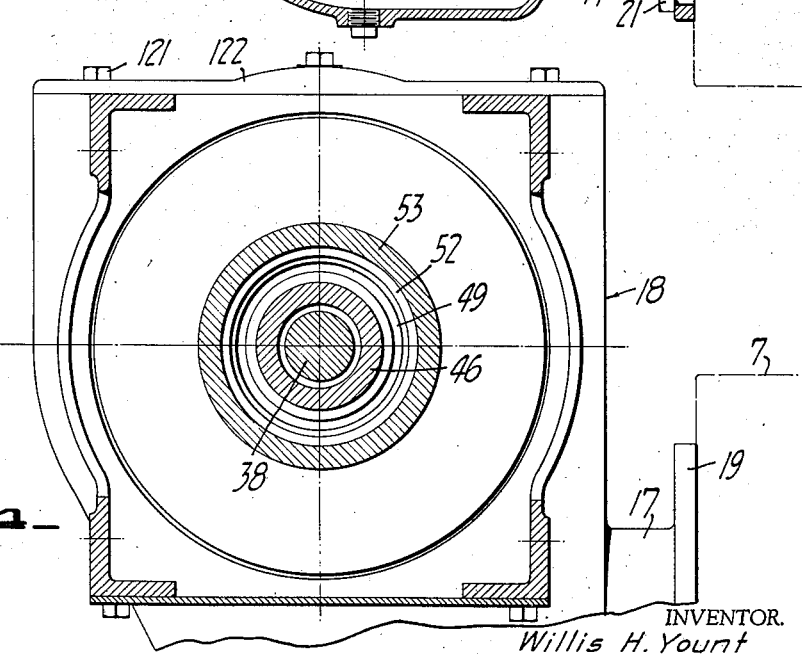
FIG_4_
INVENTOR.
Willis H. Yount
BY
Robert N. Eckhoff
ATTORNEY.

Patented Dec. 6, 1938

2,138,824

UNITED STATES PATENT OFFICE 2,138,824

HOIST

Willis H. Yount, Oakland, Calif., assignor to American Tractor Equipment Corporation, a corporation of California Application April 12, 1937, Serial No. 136,303

2 Claims. (Cl. 254—185)

This invention relates to a power unit to be mounted on a tractor, to be controlled by the operator of the tractor to the end that the operation of various elements of an implement connected to and hauled by the tractor may be controlled.

The invention is concerned with the construction of a simple, rugged hoist unit which can be effectively used to manipulate various features of an implement trailing the tractor. It is usual to mount these power units upon the rear end of a tractor to be driven by the power take-off shaft thereof. Heretofore these units have been usually mounted with the axis of the cable drums parallel to the longitudinal axis of the tractor. With the power unit so mounted, and with a vehicle trailing the tractor, it is necessary to impart a 90° twist to the cable spooled upon the drum, because the axis of a drum and the pull of the cable were parallel. Furthermore, in units of this type, when so mounted, it is necessary to practically take the whole unit apart to gain access to the clutch mechanism for any repairs. These disadvantages are obviated by the power unit of the present invention, the cable drums being placed with their axes at right angles to the direction of pull of the cables, so that spooling of the cable upon the drums is simplified. The power unit of this invention also embodies such a construction that the unit can be readily inspected or taken apart for repairs.

The invention includes numerous other objects and features of advantage, some of which, together with the foregoing, will appear hereinafter, wherein the present preferred form of the power unit of this invention is disclosed.

In the drawings accompanying and forming a part hereof, Figure 1 is a side elevational view, partly in section, of a unit embodying my invention.

Figure 2 is an end elevation of the unit, while Figures 3 and 4 are respectively sections taken along lines 3—3 and 4—4 of Figure 1.

In the drawings I have indicated the power transmission housing 7 of a suitable unit such as a tractor, providing the motive power for operation of the power unit. A power take-off shaft is indicated as 8. To engage the power take-off shaft I provide a bevel gear 9 formed upon an internally splined sleeve 11, supported in ball bearings 12. Member 13 supports the ball bearings in a spaced relationship while oil seal means 14 are provided to prevent leakage of oil into the transmission casing of the tractor. Member 13 is secured by studs 16 in an extension 17 formed upon power unit housing generally indicated at 18. Extension 17 is flanged as at 19 and studs 21 are utilized to secure housing 18 by means of the flange 19 to the transmission housing 7 of the tractor. The foregoing structure is particularly shown in Figure 3.

The housing 18 includes opposite spaced walls 26. Between these walls I mount countershaft 27 in suitable bearings such as roller bearings 28, the bearings being enclosed by caps 29 secured to walls 26 by studs 31. Upon the countershaft I mount a bevel gear 32 which engages the bevel gear 9, and is driven thereby. A pinion gear 33, mounted upon the countershaft, engages and drives a larger gear 34. This gear is secured by bolts 36 to a flange 37 formed centrally on a drive shaft 38 which extends entirely through housing 18 from one side thereof to the other. Shaft 38 is supported by bearings 39 on each side of gear 34 and by bearings 41 carried by an element 42 which is mounted for rotation in screw threads 43 in a removable cover plate 44, these cover plates being positioned at each end of the housing and closing the ends of the otherwise open housing. Studs 45 are employed to position and secure the cover plate 44 in place, upon drum housing casting 46. The drum housing castings are drum enclosing means surrounding each drum and protecting them as well as preventing unwinding of cable if its free end is released. These castings are tubular members, relieved to permit limited access to the drum. They are secured on walls 26 by studs 47.

Bearings 39 are carried in drum support members 46. These members, usually castings in the form of sleeves, having a flange 47 thereon, secured as by studs 48 to walls 26. Tapered roller bearings 49 and 50 are positioned on the drum support member 46, bearing 49 engaging a shoulder 51 on the drum support member and a shoulder 52 on the interior of the drum 53. The other bearing 50 engages a shoulder 54 also on the inside of the drum 53, the bearing being retained in place by lock nuts 55 on the end of the drum support member. This manner of mounting the drum insures that side thrust in either direction is placed upon the housing and not upon the shaft 38 or the bearings supporting this shaft although the member 46 can be eliminated and bearings 49 and 50 positioned on shaft 38 to support the drum directly on the shaft.

Mounted upon each end of the shaft 38 are driven elements 61 of a clutch carried in the clutch support member 62 slidably on shaft 38. These cooperate with cooperating elements 63 carried upon the drum to provide a clutch structure whereby an operator can control rotation of the drum selectively. The cap structure 66 is secured by screws 67 to each end of the drum, this cap structure including oil retaining means 68 bearing upon the extended portion of member 62 to retain oil within the drum or bearings 49 and 50.

Operation of each clutch by the operator is by means of bell crank 71. Each bell crank includes an arm extending adjacent to the operator. The bell cranks are mounted upon suitable support as pins 72 and are connected by a link 73 and a clevis 74 to an arm 76 supported upon rotatable element 42 carried on end plate 44.

Rotation of arm 76 serves to actuate the clutch to drive the drum positively. When the drum is driven a brake is released, this brake being otherwise applied to resist free drum rotation.

Another clevis 77 carrying a rod 78 is also secured upon arm 76. A stop 79 is positioned upon rod 78, this stop engaging a lever 81 after some movement of the bell crank 71 in a clockwise direction. Spring 82 is mounted between support 83 on the plate 44 and bolt 84 which is secured by the lever 81. Normally the spring 82 is effective to maintain a brake band 87 engaged with the brake drum 88 carried by the drum so that the drum is held against free rotation. Thus lever arm 81 carried a clevis 91 engaged by a pin 92 with one side of the brake band, while clevis 93 positioned in a fixed position by engaging the threaded end of the clevis with the member 94 shown in dotted lines in Figure 1. Counterclockwise rotation of the bell crank 71 is effective to release the clutch. This permits the clutch to run out freely under the pull of the load placed upon it. Under these circumstances it is desirable to have the rotation of the drum resisted and the brake does this to prevent the drum overrunning or the cable whipping. However, if the bell crank is operated in a clockwise direction to effect rotation of the drum by the power take-off shaft of the tractor, application of the brake is unnecessary since the drum is being positively driven. Under these circumstances, stop 79 engages a lever 81 to release the brake band from its engagement. The rotation of element 42 results in compression of the clutch elements to transmit power from the driving to the driven elements thereof. Bearings 41 are engaged and held against shoulders on the element 42 and the slidable clutch support member 62.

Because the drums are placed at right angles to the direction of pull of cables, it is a comparatively easy matter to spool the cable under the drum. It appears in Figure 2, cable 101 is led over a sheave 102, mounted upon an axle 103 and a housing structure 104. The housing structure includes the bracket 106 mounted upon top of the casing and providing a support for the sheave. The bracket 106 is hollowed out along the dotted lines so that the cable can pass freely therethrough into another bracket structure indicated at 107 which bracket is mounted for rotation in bearings 108 and 109. The bracket includes a suitable guide housing 111 on which is mounted a sheave 112 on an axle 113. The bottom bracket is rotatably supported, the cable being passed between the brackets which are placed one above the other so that the cable is substantially tangent to the drums and to the sheave. With the construction disclosed it is not necessary that the top sheave be free to rotate for successful spooling of the cable on the drum can be secured without this. In addition, the cable spools directly under the drum without having a 90° twist imposed thereupon as is the case when the cable is placed upon a drum with the present type of hoist.

The present construction is particularly adapted to compounding of the units. Thus removal of studs 121 and cover plate 122 exposes the gear 34. It is possible to mount another drum structure substantially like that disclosed, omitting the power intake mechanism but including the gear 34 and the shaft 38, the construction including as a bottom unit, for example, the construction disclosed herein as well as a substantially like structure in which the countershaft 27 is omitted so that another gear 34 can mesh directly with gear 34 in the bottom unit, attachment being made through the studs instead of into the holes provided for stud 121, one unit being superimposed upon the other so that a four drum hoist construction can be readily achieved.

Attachment of the cable to each drum is facilitated by providing a cord passage 126 extending about one end of each drum, a suitable aperture being provided into this cord passage so that the cable can be inserted therein. The cable is led around through this cord passage until it is finally opposite clamp 127. Stud 128 secures clamp 127 to lock the end of the cable against the drum and thus prevent movement of the cable on the drum, a simple lock being thus provided.

I claim:

1. In a hoist, a member flanged for attachment to a support, said member including opposite spaced walls, a shaft extending through said walls, bearings in said walls for said shaft, a gear on said shaft between said walls, a quill extending from each wall away from said gear and coaxial with said shaft, a drum coaxial with each quill, bearing means supporting each drum for rotation about a quill, said shaft end extending beyond each drum, a clutch element carried by each drum coaxially with said shaft, and a clutch element, carried coaxially by each shaft end and cooperating with a drum clutch element.

2. In a hoist, a member flanged for attachment to a support, said member including opposite spaced walls, a shaft extending through said walls, bearings in said walls for said shaft, a gear on said shaft between said walls, a quill extending from each wall away from said gear and coaxial with said shaft, a drum coaxial with each quill, bearing means supporting each drum for rotation about a quill, said shaft end extending beyond each drum, a clutch element carried by each drum coaxially with said shaft, a clutch element, carried coaxially by each shaft end and cooperating with a drum clutch element, an extension on each of said walls, bearings in each extension for said shaft, and means carried by said extension for engaging and disengaging said clutch elements.

WILLIS H. YOUNT.